United States Patent
Tanaka

(10) Patent No.: US 8,508,635 B2
(45) Date of Patent: Aug. 13, 2013

(54) SOLID-STATE IMAGING DEVICE HAVING A PLURALITY OF AD CONVERSION CIRCUITS

(75) Inventor: Takanori Tanaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 266 days.

(21) Appl. No.: 13/006,107

(22) Filed: Jan. 13, 2011

(65) Prior Publication Data
US 2011/0169988 A1    Jul. 14, 2011

(30) Foreign Application Priority Data
Jan. 13, 2010    (JP) .................... 2010-004996

(51) Int. Cl.
*H04N 3/14*    (2006.01)
*H04N 5/335*    (2011.01)

(52) U.S. Cl.
USPC ........ 348/294; 250/208.1; 341/126; 341/155; 341/159; 327/269; 327/270; 327/271; 327/272

(58) Field of Classification Search
USPC . 348/294; 341/126, 155, 159; 327/269–272; 250/208.1
See application file for complete search history.

(56) References Cited

U.S. PATENT DOCUMENTS

| 7,405,983 B1* | 7/2008 | Labin et al. ........... 365/194 |
| 8,045,027 B2* | 10/2011 | Kume ............... 348/294 |
| 2002/0131035 A1* | 9/2002 | Watanabe et al. ....... 356/5.1 |
| 2003/0197498 A1* | 10/2003 | Watanabe et al. ...... 324/76.35 |
| 2006/0055414 A1* | 3/2006 | Vincent et al. ........ 324/617 |
| 2006/0103566 A1* | 5/2006 | Vemulapalli et al. ...... 341/155 |
| 2007/0268172 A1* | 11/2007 | Watanabe ............ 341/155 |
| 2008/0316075 A1* | 12/2008 | Hasegawa ........... 341/143 |

FOREIGN PATENT DOCUMENTS
JP    2006-287879 A    10/2006

* cited by examiner

*Primary Examiner* — Antoinette Spinks
(74) *Attorney, Agent, or Firm* — Westerman, Hattori, Daniels & Adrian, LLP

(57) ABSTRACT

In a solid-state imaging device, each of a plurality of switches is connected between a pulse output terminal of each delay unit and a pulse input terminal of the next-stage delay unit. Each of a plurality of switches is connected between the pulse output terminal and the pulse input terminal of each delay unit. A plurality of switches is turned on and a plurality of switches is turned off in conjunction with an oscillation operation, and a plurality of switches is turned off and a plurality of switches is turned on in conjunction with a holding operation.

7 Claims, 12 Drawing Sheets

SOLID-STATE IMAGING DEVICE HAVING A PLURALITY OF AD CONVERSION CIRCUITS

BACKGROUND OF THE INVENTION

1. Field of the Invention

The present invention relates to a solid-state imaging device used in a digital camera, a digital camcorder, an endoscope, and the like. Priority is claimed on Japanese Patent Application No. 2010-004996, filed Jan. 13, 2010, the content of which is incorporated herein by reference.

2. Description of the Related Art

In recent years, in the technical fields of digital cameras, digital camcorders, and endoscopes, an effort to reduce the size and power consumption of products has been made. In accordance with this, reductions in the size and power consumption of a solid-state imaging device have also been demanded. As an example of a solid-state imaging device, JP-A-2006-287879 proposes a solid-state imaging device in which an A/D converter is formed by a digital circuit in order to realize reductions in size and power consumption of the solid-state imaging device. In addition, in order to read a signal from a sensor at high speed, a column A/D type solid-state imaging device which has an A/D converter for every pixel column has been proposed (known technique).

FIG. 11 shows the configuration of an A/D converter 201 disclosed in JP-A-2006-287879. The A/D converter 201 includes a Ring Delay Line (RDL) 102, a counter circuit 103, and an RDL latch circuit 104.

The RDL 102 has a plurality of inverting circuits 101a which outputs input signals after inverting them and in which a delay time changes with a power supply voltage, and one NAND circuit 101b which operates in response to a pulse signal input to its one input terminal. The plurality of inverting circuits 101a and the one NAND circuit 101b are disposed in a ring shape, and an input voltage is applied to power supply terminals of the inverting circuit 101a and the NAND circuit 101b. As a result, the RDL 102 outputs a clock signal φORDL101 which has a frequency corresponding to the size of an input voltage.

The counter circuit 103 counts the number of times of falling of the clock signal φORDL101 output from the RDL 102, and outputs a count value φOCNT106 which indicates the number of times of circulation of the clock signal φORDL101 as binary digital data. The RDL latch circuit 104 holds the outputs from each inverting circuit 101a and the NAND circuit 101b, and outputs positional information φOLAT107 which indicates the position of the clock signal φOCNT101 in the RDL 102 as binary digital data from the held value.

In addition, a control signal output circuit 105 which outputs signals (a start pulse φRDLST102, a latch signal φRDLLAT103, a count enable signal φCNTEN104, a counter reset signal φCNTRST105) for controlling the blocks (the RDL 102, the counter circuit 103, and the RDL latch circuit 104) of the A/D converter 201 is provided separately.

Next, an operation of the A/D converter 201 disclosed in JP-A-2006-287879 will be described using a timing chart shown in FIG. 12. First, at a timing T101, the counter reset signal φCNTRST105 changes to "HIGH". As a result, the count value φOCNT106 that the counter circuit 103 holds is reset. Then, at a timing T102, the counter reset signal φCNTRST105 changes to "LOW". As a result, the counter circuit 103 ends the reset operation.

Then, at a timing T103, the start pulse φRLDST102 changes to "HIGH". At the same time, the count enable signal φCNTEN104 changes to "HIGH". As a result, the RDL 102 outputs the clock signal φORDL101 which has a frequency corresponding to the size of an input voltage. At the same time, the counter circuit 103 starts an operation of counting the falling of the clock signal φORDL101.

Then, at a timing T104, the latch signal φRDLLAT103 changes to "HIGH". Then, at a timing T105, the count enable signal φCNTEN104 changes to "LOW". At the same time, the latch signal φRDLLAT103 changes to "LOW". As a result, the count operation of the counter circuit 103 ends. At the same time, the RDL latch circuit 104 holds the outputs of each inverting circuit 101a and the NAND circuit 101b. Then, at a timing T106, the start pulse φRDLST102 changes to "LOW". As a result, the RDL 102 ends the output of the clock signal φORDL101.

By the operation described above, it is possible to obtain the count value φOCNT106 when a certain fixed period (T103 to T105) has elapsed and the positional information φOLAT107 of the clock signal φORDL101 in the RDL 102. Then, the A/D converter 201 outputs a digital signal, which has the count value φOCNT106 as a high-order bit and the positional information φOLAT107 as a low-order bit, as an A/D conversion result. By the above operation, the A/D converter 201 can obtain a digital signal corresponding to the size of the input voltage.

FIG. 13 shows the configuration of an A/D type solid-state imaging device in which the A/D converter 201 disclosed in JP-A-2006-287879 is provided for every pixel column in order to realize reductions in size and power consumption and to read a signal from a sensor at high speed. The solid-state imaging device shown in FIG. 13 includes a pixel array 2, a vertical scanning circuit 3, four A/D converters 201 (an ADC 1, an ADC 2, an ADC 3, and an ADC 4), an ADC latch circuit 5, a control signal output circuit 6, and a horizontal scanning circuit 7.

In the pixel array 2, pixels 1 each of which has at least a photoelectric conversion element and outputs a pixel signal φPIX1 corresponding to the amount of incident light are arrayed in a two-dimensional manner (4 rows×4 columns in the example shown in FIG. 13). The vertical scanning circuit 3 performs row selection of the pixel array 2 using pixel selection signals φV1 to φV4. The A/D converter 201 is disposed for every pixel column of the pixel array 2 and performs analog-to-digital conversion of a pixel signal φPIX1 read from the pixels 1. The ADC latch circuit 5 holds the output signal of the A/D converter 201. The control signal output circuit 6 outputs signals for controlling the A/D converter 201 and the ADC latch circuit 5. The horizontal scanning circuit 7 controls the ADC latch circuit 5 using column selection signals φH1 to φH4 so that the digital signals held in the ADC latch circuit 5 are output to the respective columns.

When the A/D converter 201 is provided for every pixel column, the horizontal width in which the A/D converter 201 can be disposed is restricted by the pixel pitch P (refer to FIG. 13). Accordingly, when the A/D converter 201 is provided for every pixel column, it is necessary to make the A/D converter 201 smaller than that in the related art. However, an invention for making the A/D converter 201 smaller has not yet been proposed.

SUMMARY OF THE INVENTION

The invention has been made in view of the above situation, and it is an object of the invention to provide a solid-state imaging device capable of realizing reductions in size and power consumption.

According to an aspect of the invention, there is provided a solid-state imaging device including: a plurality of pixels arrayed in a matrix; and a plurality of AD conversion circuits provided for every column of the plurality of pixels and which converts analog signals from the plurality of pixels into digital signals. Each of the plurality of AD conversion circuits includes: a ring delay circuit which has a plurality of delay units that outputs a pulse signal input to a pulse input terminal from a pulse output terminal after delaying the pulse signal by a delay time corresponding to the analog signal, in which the pulse output terminal of each of the plurality of delay units is connected to the pulse input terminal of the next-stage delay unit, and in which the plurality of delay units is connected to each other in a ring shape so that the pulse signal circulates through the plurality of delay units; a plurality of first switches each of which is connected between the pulse output terminal of each delay unit and the pulse input terminal of the next-stage delay unit; a plurality of second switches each of which is connected between the pulse output terminal and the pulse input terminal of each of the delay units; and a control circuit which turns on the plurality of first switches and turns off the plurality of second switches in conjunction with an oscillation operation and which turns off the plurality of first switches and turns on the plurality of second switches in conjunction with a holding operation.

Moreover, in the solid-state imaging device according to the aspect of the invention, it is preferable that each of the plurality of AD conversion circuits further include a third switch connected to the pulse output terminal of one of the plurality of delay units and the control circuit turn on the third switch in conjunction with a read operation in a hold state so that the first switch is turned on and the second switch is turned off in a sequential manner.

Moreover, in the solid-state imaging device according to the aspect of the invention, it is preferable that each of the plurality of AD conversion circuits further include a third switch connected to the pulse output terminal of each of the delay units and the control circuit turn on the third switch in conjunction with a read operation in a hold state.

Moreover, in the solid-state imaging device according to the aspect of the invention, it is preferable that each of the plurality of AD conversion circuits further include a switching circuit which has a first input terminal to which the analog signal is input, a second input terminal connected to a constant voltage source, and an output terminal connected to power input terminals of the plurality of delay units and which selects a first state, in which the analog signal input to the first input terminal is output from the output terminal, or a second state, in which a signal from the constant voltage source input to the second input terminal is output from the output terminal.

Moreover, in the solid state-state imaging device according to the aspect of the invention, it is preferable that the switching circuit select the first state during a period of the oscillation operation and select the second state during a period of the holding operation.

Moreover, in the solid-state imaging device according to the aspect of the invention, it is preferable that the switching circuit have a period, in which neither the first state nor the second state is selected, when the first state switches to the second state.

Moreover, in the solid-state imaging device according to the aspect of the invention, it is preferable that a voltage output from the output terminal of the switching circuit gradually change when the first state switches to the second state.

DETAILED DESCRIPTION OF THE INVENTION

Hereinafter, embodiments of the invention will be described with reference to the accompanying drawings.

First Embodiment

Figure 1:
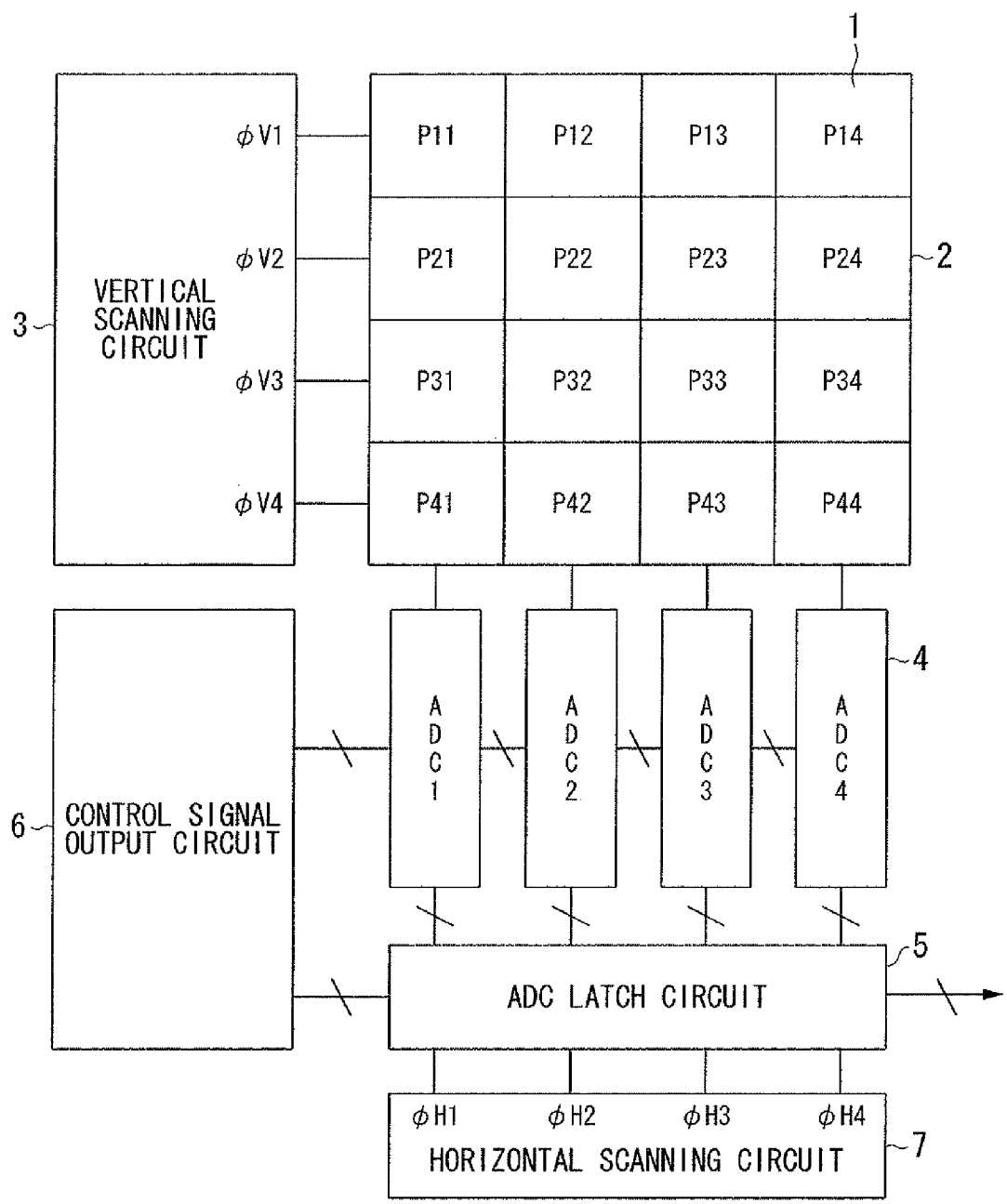
FIG. 1 is a block diagram showing the configuration of a solid-state imaging device according to a first embodiment of the invention.

First, a first embodiment of the invention will be described. FIG. 1 shows the configuration of a solid-state imaging device according to the present embodiment. The solid-state imaging device shown in FIG. 1 includes a pixel array 2, a vertical scanning circuit 3, four A/D converters 4 (an ADC 1, an ADC 2, an ADC 3, and an ADC 4), an ADC latch circuit 5, a control signal output circuit 6, and a horizontal scanning circuit 7.

In the pixel array 2, pixels 1 each of which has at least a photoelectric conversion element and outputs a pixel signal φPIX1 corresponding to the amount of incident light are arrayed in a two-dimensional manner (4 rows×4 columns in the example shown in FIG. 1). The vertical scanning circuit 3 performs row selection of the pixel array 2 using pixel selection signals φV1 to φV4. The A/D converter 4 is disposed for every pixel column of the pixel array 2 and performs analog-to-digital conversion of a pixel signal φPIX1 read from the pixels 1. The ADC latch circuit 5 holds the output signal of the A/D converter 4. The control signal output circuit 6 outputs signals for controlling the A/D converter 4 and the ADC latch circuit 5. The horizontal scanning circuit 7 controls the ADC latch circuit 5 using column selection signals φH1 to φH4 so that the digital signals held in the ADC latch circuit 5 are output to the respective columns.

Figure 2:
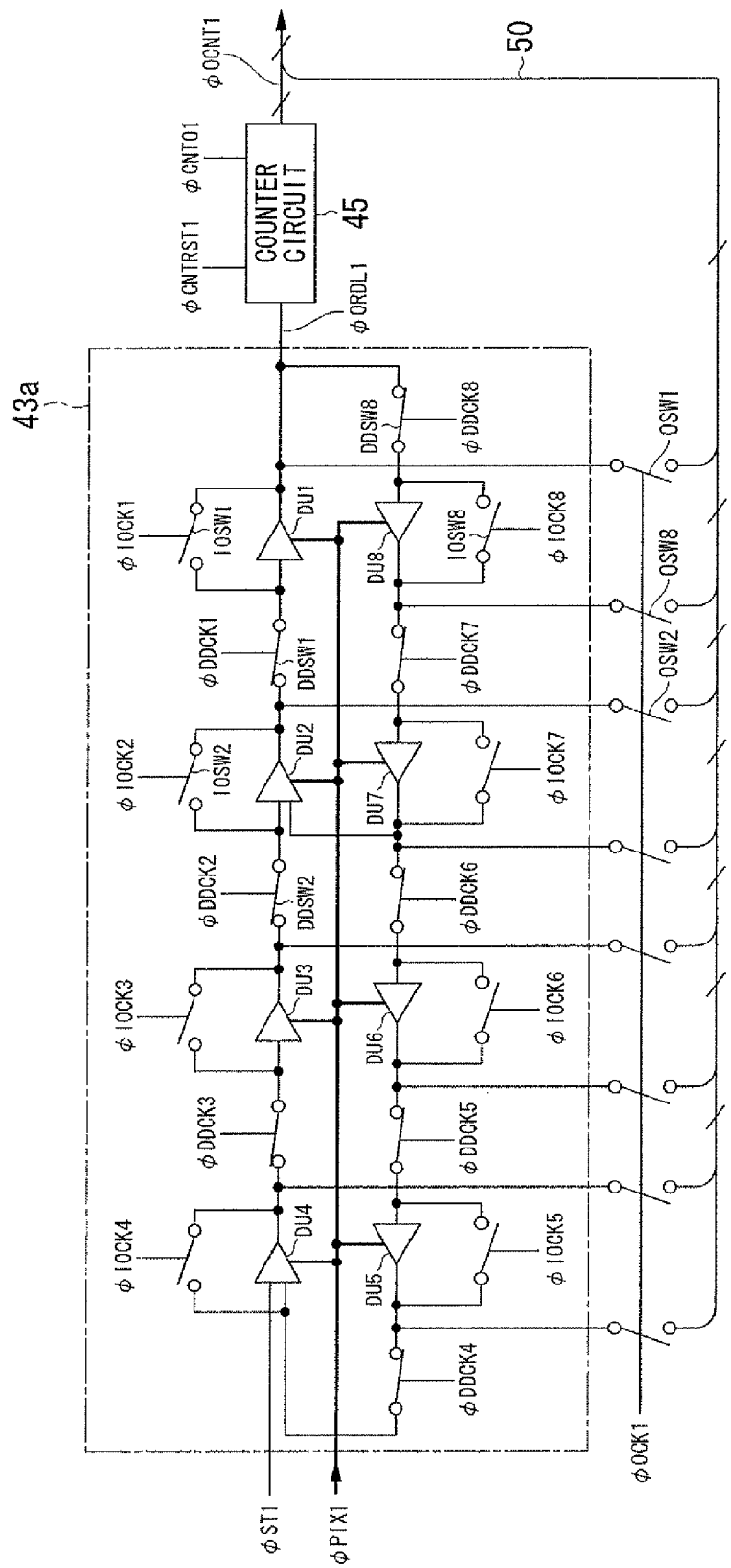
FIG. 2 is a block diagram showing the configuration of an A/D converter provided in the solid-state imaging device according to the first embodiment of the invention.

FIG. 2 shows the configuration of the A/D converter 4. The A/D converter 4 shown in FIG. 2 includes a Ring Delay Line (RDL) 43a, a plurality of switches OSW1 to OSW8, and a counter circuit 45.

The RDL 43a includes a plurality of delay units DU1 to DU8, a plurality of switches DDSW1 to DDSW8, and a plurality of switches IOSW1 to IOSW8. In addition, reference numerals are not given to some constituent components in order to make the drawing simple.

Each of the plurality of delay units DU1 to DU8 delays a pulse signal input to its input terminal by a delay time, which changes with an analog power supply voltage, and outputs it from its output terminal. An output terminal of each of the plurality of delay units DU1 to DU8 is connected to an input terminal of the next-stage delay unit. That is, the plurality of delay units DU1 to DU8 is connected in a ring shape so that a pulse signal circulates through the plurality of delay units DU1 to DU8.

Each of the plurality of switches DDSW1 to DDSW8 is connected between the output terminal of each delay unit and the input terminal of the next-stage delay unit. Specifically, the switch DDSW1 is connected between the output terminal of the delay unit DU2 and the input terminal of the delay unit DU1. The switch DDSW2 is connected between the output terminal of the delay unit DU3 and the input terminal of the delay unit DU2. The switch DDSW3 is connected between the output terminal of the delay unit DU4 and the input terminal of the delay unit DU3. The switch DDSW4 is connected between the output terminal of the delay unit DU5 and the input terminal of the delay unit DU4. The switch DDSW5 is connected between the output terminal of the delay unit DU6 and the input terminal of the delay unit DU5. The switch DDSW6 is connected between the output terminal of the delay unit DU7 and the input terminal of the delay unit DU6. The switch DDSW7 is connected between the output terminal of the delay unit DU8 and the input terminal of the delay unit DU7. The switch DDSW8 is connected between the output terminal of the delay unit DU1 and the input terminal of the delay unit DU8. In addition, the plurality of switches DDSW1 to DDSW8 is turned on at the time of an oscillation operation in which a pulse signal circulates through the plurality of delay units DU1 to DU8 and turned off at the time of a holding operation in which the output signals of the plurality of delay units DU1 to DU8 are held.

Each of the plurality of switches IOSW1 to IOSW8 is connected between output and input terminals of each delay unit. Specifically, the switch IOSW1 is connected between the output and input terminals of the delay unit DU1. The switch IOSW2 is connected between the output and input terminals of the delay unit DU2. The switch IOSW3 is connected between the output and input terminals of the delay unit DU3. The switch IOSW4 is connected between the output and input terminals of the delay unit DU4. The switch IOSW5 is connected between the output and input terminals of the delay unit DU5. The switch IOSW6 is connected between the output and input terminals of the delay unit DU6. The switch IOSW7 is connected between the output and input terminals of the delay unit DU7. The switch IOSW8 is connected between the output and input terminals of the delay unit DU8. In addition, the plurality of switches IOSW1 to IOSW8 is turned off at the time of the oscillation operation and turned on at the time of the holding operation.

A pixel signal $\phi$PIW1 output from the pixel array 2 is applied to power supply terminals of the delay units DU1 to DU8. As a result, the RDL 43a outputs a clock signal $\phi$ORDL1 which has a frequency corresponding to the size of the pixel signal $\phi$PIX1.

One ends of the plurality of switches OSW1 to OSW8 are connected to the output terminals of the corresponding delay units DU1 to DU8, respectively. In addition, the other ends of the plurality of switches OSW1 to OSW8 are connected to an output signal line 50. Specifically, one end of the switch OSW1 is connected to the output terminal of the delay unit DU1. One end of the switch OSW2 is connected to the output terminal of the delay unit DU2. One end of the switch OS3 is connected to the output terminal of the delay unit DU3. One end of the switch OS4 is connected to the output terminal of the delay unit DU4. One end of the switch OS5 is connected to the output terminal of the delay unit DU5. One end of the switch OS6 is connected to the output terminal of the delay unit DU6. One end of the switch OS7 is connected to the output terminal of the delay unit DU7. One end of the switch OS8 is connected to the output terminal of the delay unit DU8. In addition, the plurality of switches OSW1 to OSW8 is turned off at the time of the oscillation operation and holding operation and turned on when reading an output signal held by the holding operation, that is, at the time of the read operation.

The counter circuit 45 counts the number of times of output of the clock signal $\phi$ORDL1 output from the RDL 43a and outputs a count value $\phi$CNT1, which indicates the number of times of circulation of the clock signal $\phi$ORDL1, as binary digital data.

Figure 3A:
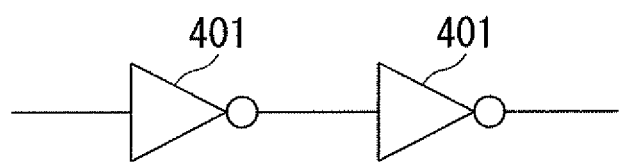
FIGS. 3A to 3C are circuit diagrams showing the configuration of a delay unit within the A/D converter provided in the solid-state imaging device according to the first embodiment of the invention.
Figure 3B:
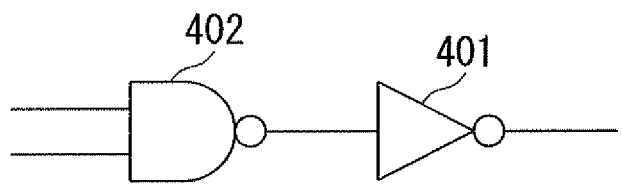
Figure 3C:
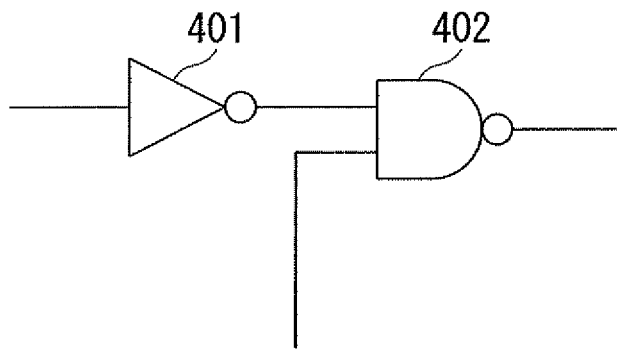

The configuration of the delay units DU1 to DU8 is divided into the following three groups. The first configuration is the delay units DU1, DU3, and DU5 to DU8 formed by connecting NOT circuits 401 in series to each other (refer to FIG. 3A). The second configuration is the delay unit DU4 formed by connecting a NAND circuit 402 and the NOT circuit 401 in series in this order (refer to FIG. 3B). The third configuration is the delay unit DU2 formed by connecting the NOT circuit 401 and the NAND circuit 402 in series in this order (refer to FIG. 3C). Moreover, in order to oscillate the RDL 43a, an output signal of the delay unit DU7 is fed back to one input terminal of the delay unit DU2.

Figure 4:
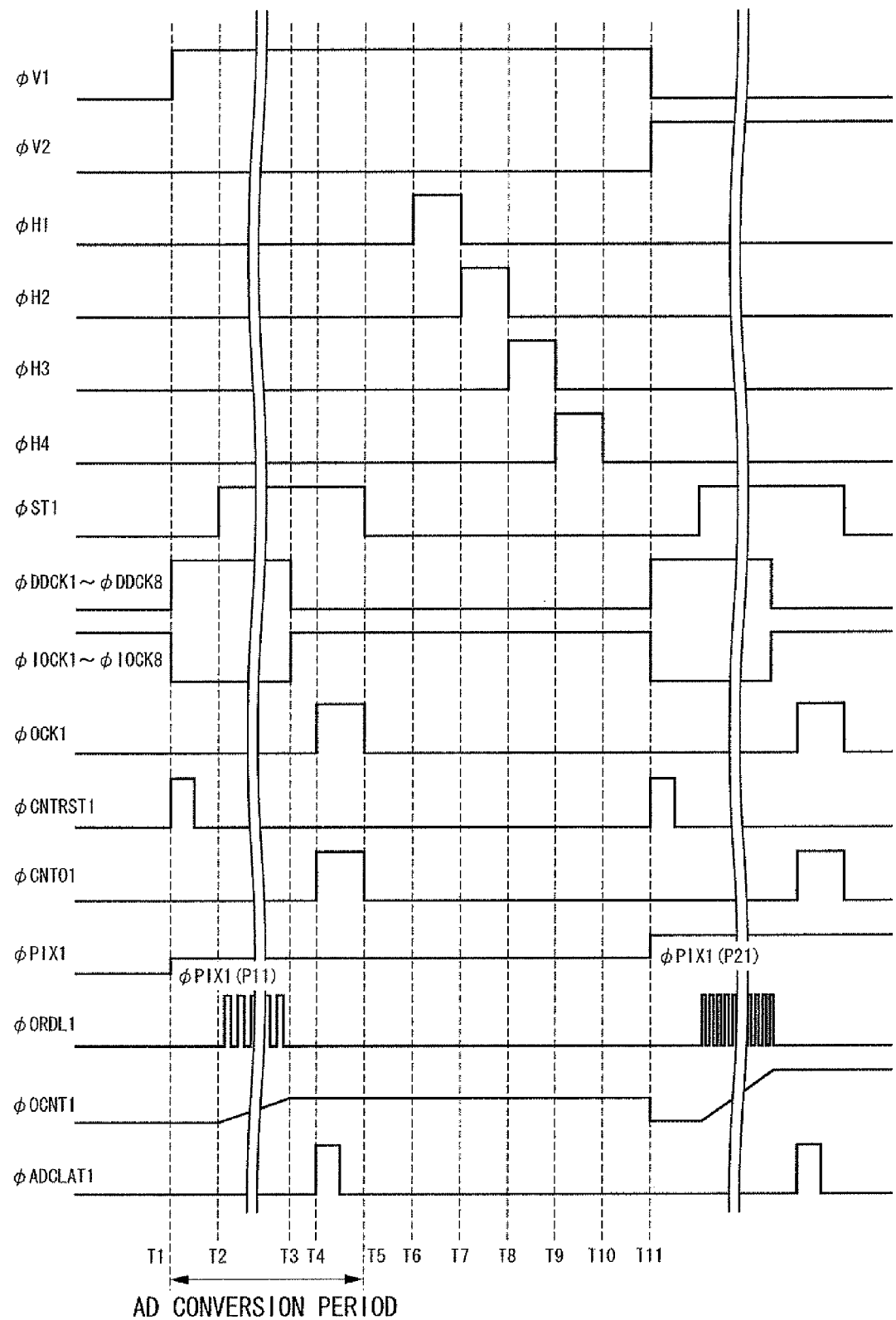
FIG. 4 is a timing chart showing the operation of the solid-state imaging device according to the first embodiment of the invention.

Next, an operation of the solid-state imaging device according to the present embodiment will be described using the timing chart shown in FIG. 4. Regarding the operations of the A/D converters 4 (ADC 1, ADC 2, ADC 3, and ADC 4), only the A/D converter 4 (ADC 1) will be described. Since the operations of the other A/D converters 4 (ADC 2, ADC 3, and ADC 4) are the same as that of the A/D converter 4 (ADC 1), the explanation will be omitted. In addition, signals ($\phi$ST1, $\phi$DDCK1 to $\phi$DDCK8, $\phi$IOCK1 to $\phi$IOCK8, $\phi$OCK1, $\phi$CNTRS1, and $\phi$CNTO1) which control the A/D converter 4 and a signal ($\phi$ADCLAT1) which controls the ADC latch circuit 5 are output from the control signal output circuit 6. Details of each control signal will be described later.

First, at a timing T1, the pixel selection signal $\phi$V1, the clock signals $\phi$DDCK1 to $\phi$DDCK8 which control the plurality of switches DDSW1 to DDSW8, and a counter reset signal $\phi$CNTRST1 change to "HIGH". At the same time, the clock signals $\phi$IOCK1 to $\phi$IOCK8 which control the plurality of switches IOSW1 to IOSW8 change to "LOW". As a result, the pixels 1 (P11, P12, P13, and P14) in the first row controlled by the pixel selection signal $\phi$V1 are selected, and the pixel signal $\phi$PIX1 (P11, P12, P13, and P14) of the pixels 1 (P11, P12, P13, and P14) is output to the A/D converter 4. In addition, the plurality of switches DDSW1 to DDSW8 is turned on. At the same time, the plurality of switches IOSW1 to IOSW8 is turned off and a count value $\phi$OCT1 that the counter circuit 45 holds is reset. At this time, the other pixel selection signals $\phi$V2, $\phi$V3, and $\phi$V4 remain at "LOW".

Then, the counter reset signal φCNTRST1 changes to "LOW" and accordingly, the counter circuit 45 ends the reset operation.

Then, at a timing T2, a start pulse φST1 changes to "HIGH". As a result, the RDL 43a outputs the clock signal φORDL1, which has a frequency corresponding to the pixel signal φPIX1 (P11), and the counter circuit 45 starts a count operation of counting the number of times of rising (or the number of times of falling) of the clock signal φORDL1.

Then, at a timing T3, the clock signals φDDCK1 to φDDCK8 change to "LOW" and the clock signals φIOCK1 to φIOCK8 change to "HIGH". As a result, the plurality of switches DDSW1 to DDSW8 is turned off, and the plurality of switches IOSW1 to IOSW8 is turned on. Therefore, the output signals of the delay units DU1 to DU8 at the timing T3 are held in feedback loops formed by the delay units DU1 to DU8 and the corresponding switches IOSW1 to IOSW8.

Then, at a timing T4, the clock signal φOCK1 which controls the plurality of switches OSW1 to OSW8, the count value output signal φCNTO1 which controls the counter circuit 45, and the signal φADCLAT1 which controls the ADC latch circuit 5 change to "HIGH". As a result, the plurality of switches OSW1 to OSW8 is turned on and the output signals of the plurality of delay units DU1 to DU8 and the count value φCNT1 of the counter circuit 45 are output to the ADC latch circuit 5.

Then, the signal φADCLAT1 changes to "LOW" and accordingly, the ADC latch circuit 5 holds an output signal of the A/D converter 4. Then, at a timing T5, the clock signal φOCK1, the count value output signal φCNTO1, and the start pulse φST1 change to "LOW". As a result, the A/D converter 4 stops the output of a signal and the A/D conversion operation ends.

Then, at a timing T6, the row selection signal W1 changes to "HIGH" and accordingly, the ADC latch circuit 5 outputs a digital signal corresponding to the pixel signal φPIX1 (P11) in the first row. Then, at a timing T7, the row selection signal φH1 changes to "LOW" and the row selection signal W2 changes to "HIGH". As a result, the ADC latch circuit 5 outputs a digital signal corresponding to the pixel signal φPIX1 (P12) in the second row. Then, at timings T8, T9, and T10, the row selection signals φH2, φH3, and φH4 are sequentially switched. Thus, a read operation of pixel signals of the first row is completed.

Then, at a timing T11, the pixel selection signal φV1 and the clock signals φIOCK1 to φIOCK8 change to "LOW". At the same time, the pixel selection signal φV2, the clock signals φDDCK1 to φDDCK8, and the counter reset signal φCNTRST change to "HIGH". As a result, pixels in the first row are not selected, and the pixels 1 (P21, P22, P23, and P24) in the second row are selected. In addition, the plurality of switches DDSW1 to DDSW8 is turned on. At the same time, the plurality of switches IOSW1 to IOSW8 is turned off and the count value φCNT1 that the counter circuit 45 holds is reset.

Then, a read operation of a pixel signal of the second row is completed by performing the same operation as in the case of the first row. Also for the third and fourth rows, the same operation as in the cases of the first and second rows is performed. As a result, a read operation of all pixels is completed.

As described above, according to the present embodiment, output signals of the plurality of delay units DU1 to DU8 are held in feedback loops by forming the feedback loops with the delay units DU1 to DU8 and the corresponding switches IOSW1 to IOSW8 at the time of the holding operation. By this operation, the output signals of the delay units DU1 to DU8 can be held in feedback loops without providing a latch circuit. Therefore, the A/D converter 4 can be made to be smaller than the A/D converter 201 in the related art. In addition, reductions in size and power consumption of a solid-state imaging device can be realized. In addition, a signal from a sensor can be read at high speed by providing the A/D converter 4 for every pixel column.

In addition, signals held in the feedback loops formed by the delay units DU1 to DU8 and the corresponding switches IOSW1 to IOSW8 can also be collectively read through the switches OSW1 to OSW8 by the clock signal φOCK1. Therefore, a simple signal read operation can be realized.

Second Embodiment

Figure 5:
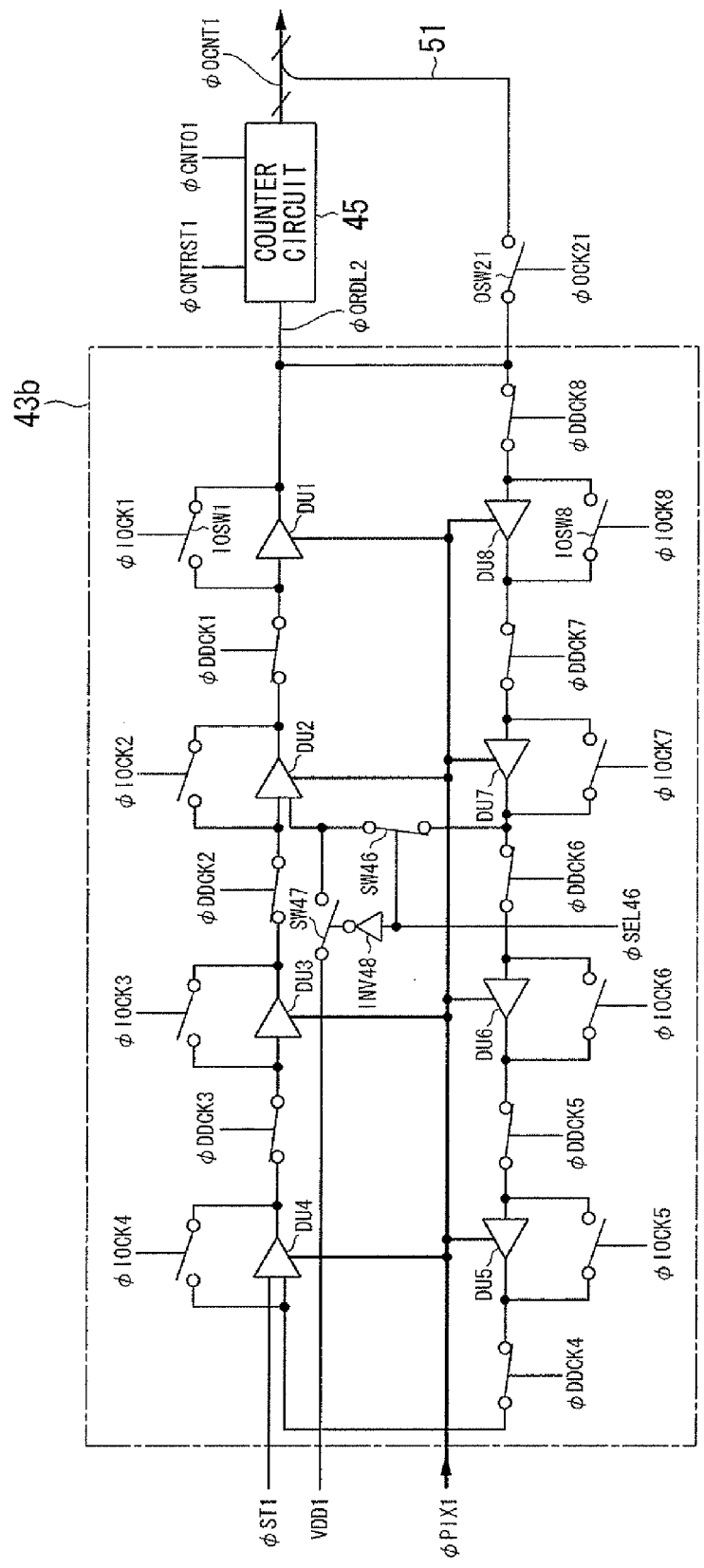
FIG. 5 is a block diagram showing the configuration of an A/D converter provided in a solid-state imaging device according to a second embodiment of the invention.

Next, a second embodiment of the invention will be described. FIG. 5 shows the configuration of an A/D converter 4 in the present embodiment. The A/D converter 4 shown in FIG. 5 has an RDL 43b formed by changing the configuration of the RDL 43a in the first embodiment. Specifically, a switch SW46, which is connected between one input terminal of the delay unit DU2 and the output terminal of the delay unit DU7, and a switch SW47, which has one end connected between one end of the switch SW46 and one input terminal of the delay unit DU2 and the other end connected to a constant voltage VDD1, are provided. In addition, a NOT circuit INV48, to which a signal φSEL46 for controlling the switch SW46 is input and which outputs the inverting signal as a control signal of the switch SW47, is further provided. Unlike in the above, the plurality of switches OSW1 to OSW8 is not provided. However, a switch OSW21, which has one end connected to the output end of the delay unit DU1 and the other end connected to an output signal line 51, is provided. Since the configuration is otherwise the same as that shown in FIG. 2, the explanation will be omitted.

Figure 6:
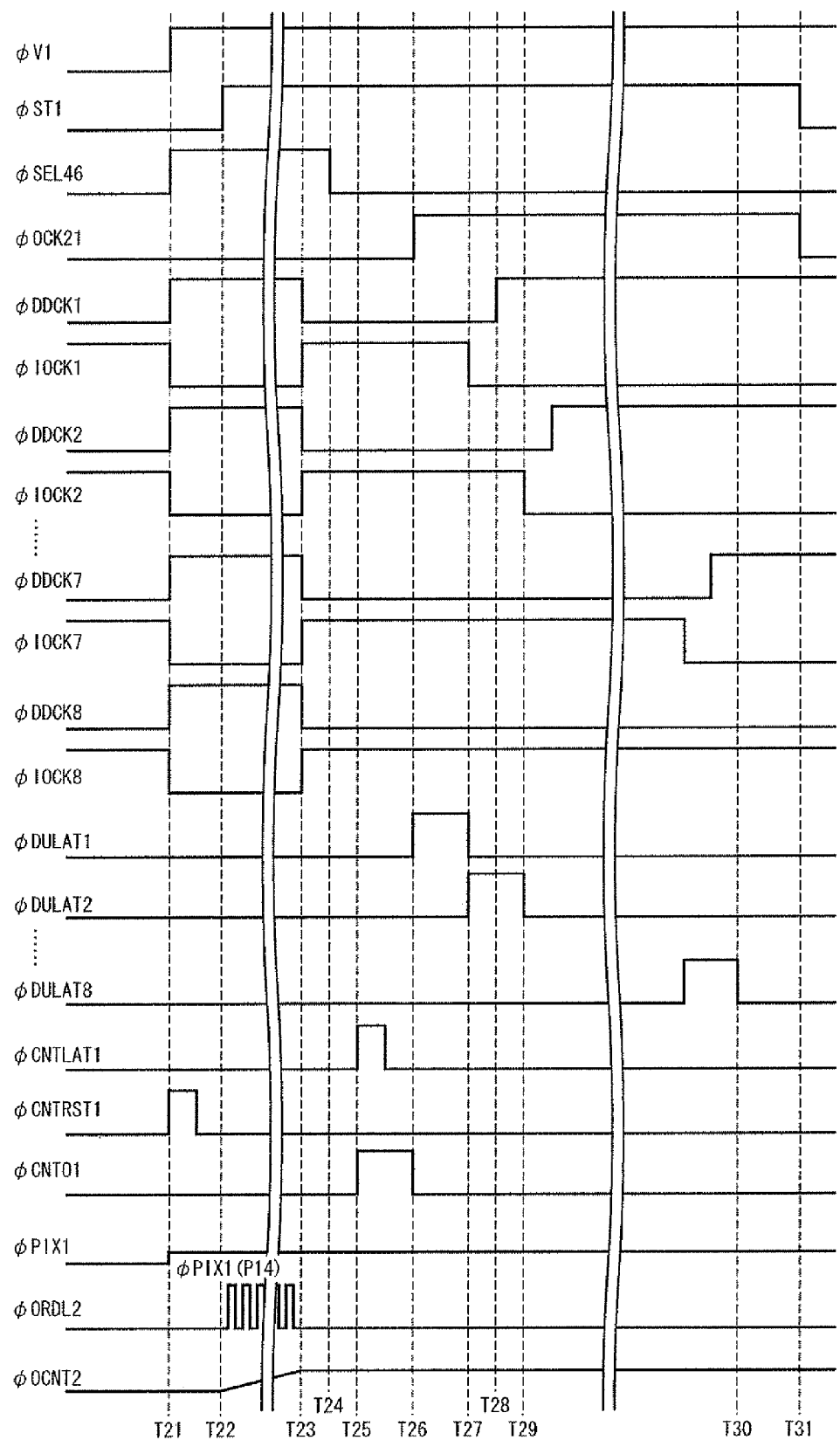
FIG. 6 is a timing chart showing the operation of the solid-state imaging device according to the second embodiment of the invention.

Next, an operation of the solid-state imaging device according to the present embodiment will be described using the timing chart shown in FIG. 6. In addition, since operations other than an operation in the A/D conversion period are the same as those in the first embodiment, the explanation will be omitted. Signals (φST1, φSEL46, φDDCK1 to φDDCK8, φIOCK1 to φIOCK8, φOCK21, φCNTRST1, and φCNTO1) which control the A/D converter 4 and signals (φDULAT1 to φDULAT8 and φCNTLAT1) which control the ADC latch circuit 5 are output from the control signal output circuit 6. Details of each control signal will be described later.

First, at a timing T21, a pixel selection signal φV1, clock signals φDDCK1 to φDDCK8 which control the plurality of switches DDSW1 to DDSW8, a counter reset signal φCNTRST1, and a signal φSEL46 which controls the switch SW46 change to "HIGH". At the same time, the clock signals φIOCK1 to φIOCK8 which control the plurality of switches IOSW1 to IOSW8 change to "LOW". As a result, the pixels 1 (P11, P12, P13, and P14) in the first row controlled by the pixel selection signal φV1 are selected, and the pixel signal φPIX1 (P11, P12, P13, and P14) of the pixels 1 (P11, P12, P13, and P14) is output to the A/D converter 4. At this time, the other pixel selection signals φV2, φV3, and φV4 remains at "LOW". In addition, the plurality of switches DDSW1 to DDSW8 and the switch SW46 are turned on, and the plurality of switches IOSW1 to IOSW8 and the switch SW47 are turned off. In addition, the count value φOCNT2 that the counter circuit 45 holds is reset. Then, the counter reset signal φCNTRST1 changes to "LOW" and accordingly, the counter circuit 45 ends the reset operation.

Then, at a timing T22, a start pulse φST1 changes to "HIGH". As a result, the RDL 43b outputs a clock signal φORDL2, which has a frequency corresponding to the pixel signal φPIX1 (P11), and the counter circuit 45 starts a count operation of counting the number of times of rising (or the number of times of falling) of the clock signal φORDL2.

Then, at a timing T23, the clock signals φDDCK1 to φDDCK8 change to "LOW" and the clock signals φIOCK1 to φIOCK8 change to "HIGH". As a result, the plurality of switches DDSW1 to DDSW8 is turned off, and the plurality of switches IOSW1 to IOSW8 is turned on. Therefore, the output signals of the delay units DU1 to DU8 at the timing T23 are held in feedback loops formed by the delay units DU1 to DU8 and the corresponding switches IOSW1 to IOSW8.

Then, at a timing T24, the signal φSEL46 changes to "LOW" and the switch SW46 is turned off. At the same time, the switch SW47 is turned on. As a result, a constant voltage VDD1 is input to one input terminal of the delay unit DU2.

Then, at a timing T25, a counter output latch signal φCNTLAT1 and a count value output signal φCNTO1 change to "HIGH". As a result, the counter circuit 45 outputs the count value φOCNT2 to the ADC latch circuit 5. Then, when the counter output latch signal φCNTLAT1 changes to "LOW", the ADC latch circuit 5 holds the output signal (φCNT2) of the counter circuit 45.

Then, at a timing T26, a clock signal φOCK21 which controls the switch OSW21 and a signal φDULAT1 which controls the ADC latch circuit 5 change to "HIGH", and the count value output signal φCNTO1 changes to "LOW". As a result, a signal held in a feedback loop formed by the delay unit DU1 and the switch IOSW1 is output to the ADC latch circuit 5 and the counter circuit 45 ends the output of the count value φOCNT2.

Then, at a timing T27, the clock signal φOCK1 and the signal φDULAT1 change to "LOW" and the signal φDULAT2 changes to "HIGH". As a result, the ADC latch circuit 5 holds the output signal (output signal of the delay unit DU1) of the RDL 43b. Then, at a timing T28, the clock signal φDDCK1 changes to "HIGH". As a result, a signal held in a feedback loop formed by the delay unit DU2 and the switch IOSW2 is output to the ADC latch circuit 5 through the delay unit DU1.

Then, at a timing T29, the clock signal φIOCK2 and the signal φDULAT2 change to "LOW". At the same time, the signal φDULAT3 changes to "HIGH". As a result, the ADC latch circuit 5 holds the output signal (output signal of the delay unit DU2) of the RDL 43b. At a timing T30, the same operation is repeated until the signal φDULAT8 changes to "LOW". As a result, the output signal of each of the delay units DU1 to DU8 is held in the ADC latch circuit 5. Then, at a timing T31, the start pulse φST1 and the clock signal φOCK21 change to "LOW" and the A/D conversion operation ends.

In the above operation, the reason the switch SW46 is turned off and the switch SW47 is turned on at the same time at the timing T24 is as follows. Signals held in the feedback loops formed by the delay units DU2 to DU8 and the corresponding switches IOSW1 to IOSW8 are sequentially output to the next delay unit and finally output from the delay unit DU1 at the time of a read operation. When a signal input to one input terminal of the delay unit DU2 is "LOW" at the time of this read operation, the output signal of the delay unit DU2 is fixed to "HIGH" irrespective of a state of a signal input to the other input terminal. Accordingly, at the timing T24, the switch SW46 is turned off and the switch SW47 is turned on at the same time. As a result, since the constant voltage VDD1 is applied to one input terminal of the delay unit DU2, the delay unit DU2 can output an output signal from the delay unit DU3 as it is.

As described above, according to the present embodiment, the output signals of the delay units DU1 to DU8 can be held without providing a latch circuit similar to the first embodiment. In addition, according to the present embodiment, the switches OSW1 to OSW8 in the first embodiment are not provided. Therefore, compared with the first embodiment, the number of switches for outputting the output signals of the delay units DU1 to DU8 to the ADC latch circuit 5 can be reduced. For this reason, the A/D converter 5 can be made to be even smaller than in the first embodiment. Therefore, further reductions in size and power consumption of a solid-state imaging device can be realized and a signal from a sensor can be read at high speed.

Third Embodiment

Figure 7:
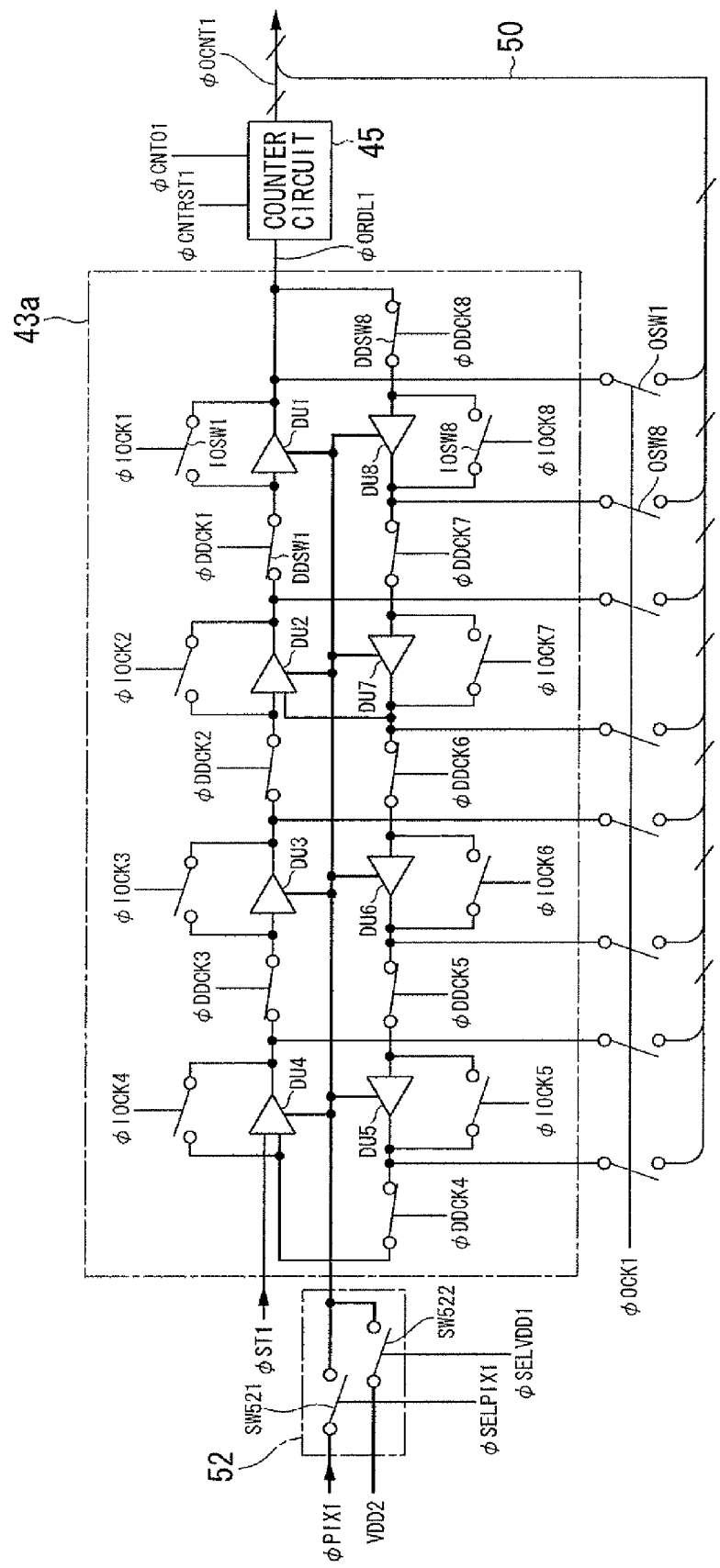
FIG. 7 is a block diagram showing the configuration of a solid-state imaging device according to a third embodiment of the invention.

Next, a third embodiment of the invention will be described. FIG. 7 shows the configuration of an A/D converter 4 in the present embodiment. The A/D converter 4 shown in FIG. 7 is different from the A/D converter 4 in the first embodiment in that a switching circuit 52, to which a constant voltage VDD2 and a pixel signal φPIX1 output from the pixel array 2 are input and which outputs either one of them according to a pixel signal selection signal φSELPIX1 and a constant-voltage selection signal φSELVDD1, is provided. The switching circuit 52 has a switch SW521, which is turned on or off by the pixel signal selection signal φSELPIX1, and a switch SW522, which is turned on or off by the constant-voltage selection signal φSELVDD1. Since the configuration is otherwise the same as that shown in FIG. 2, the explanation will be omitted.

Figure 9:
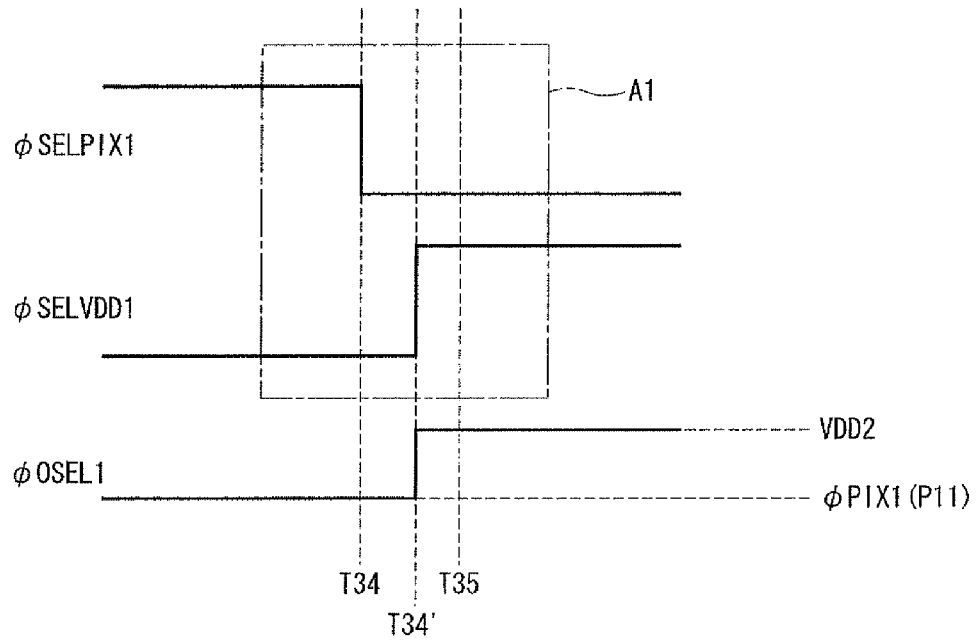
FIG. 9 is a timing chart explaining another operation of the solid-state imaging device according to the third embodiment of the invention.

Next, an operation of a solid-state imaging device according to the present embodiment will be described using a timing chart shown in FIG. 9. In addition, only an A/D conversion period will be described, and the other operations will not be described because they are the same as in the first embodiment. In addition, signals φST1, φDDCK1 to φDDCK8, φIOCK1 to φIOCK8, φOCK1, φCNTRST1, φCNTO1, φSELPIX1, and φSELVDD1) which control the A/D converter 4 and a signal (φADCLAT1) which controls the ADC latch circuit 5 are output from the control signal output circuit 6.

First, at a timing T31, a pixel selection signal φV1, the clock signals φDDCK1 to φDDCK8 which control the plurality of switches DDSW1 to DDSW8, the counter reset signal φCNTRST1, and the pixel signal selection signal φSELPIX1 change to "HIGH". At the same time, the clock signals φIOCK1 to φIOCK8 which control the plurality of switches IOSW1 to IOSW8 and the constant-voltage selection signal φSELVDD1 change to "LOW". As a result, the pixels 1 (P11, P12, P13, and P14) in the first row controlled by the pixel selection signal φV1 are selected, and the pixel signal φPIX1 (P11, P12, P13, and P14) of the pixels 1 (P11, P12, P13, and P14) is output to the A/D converter 4. At this time, the other pixel selection signals φV2, φV3, and φV4 remain at "LOW".

The pixel signal φPIX1 and the constant voltage VDD2 are input to the switching circuit 52, and the switching circuit 52 outputs the pixel signal φPIX1 to power supply terminals of the plurality of delay units DU1 to DU8. At this time, the switch SW521 is turned on and the switch SW522 is turned off. In addition, the plurality of switches DDSW1 to DDSW8 is turned on. At the same time, the plurality of switches IOSW1 to IOSW8 is turned off. In addition, the count value φOCNT1 that the counter circuit 45 holds is reset. Then, the counter reset signal φCNTRST1 changes to "LOW" and accordingly, the counter circuit 45 ends the reset operation.

Then, at a timing T32, a start pulse φST1 changes to "HIGH". As a result, the RDL 43a outputs a clock signal φORDL1, which has a frequency corresponding to the pixel signal φPIX1 (P11), and the counter circuit 45 starts a count operation of counting the number of times of rising (or the number of times of falling) of the clock signal φORDL1.

Then, at a timing T33, the clock signals φDDCK1 to φDDCK8 change to "LOW". At the same time, the clock signals φIOCK1 to φIOCK8 change to "HIGH". As a result, the plurality of switches DDSW1 to DDSW8 is turned off. At the same time, the plurality of switches IOSW1 to IOSW8 is turned on. Therefore, the output signals of the delay units DU1 to DU8 at the timing T33 are held in feedback loops formed by the delay units DU1 to DU8 and the corresponding switches IOSW1 to IOSW8.

Then, at a timing T34, the pixel signal selection signal φSELPIX1 changes to "LOW". At the same time, the constant-voltage selection signal φSELVDD1 changes to "HIGH". As a result, the switching circuit 52 outputs the constant voltage VDD2 to the power supply terminals of the plurality of delay units DU1 to DU8. At this time, the switch SW521 is turned off and the switch SW522 is turned on. Then, at a timing T35, the clock signal φOCK1 which controls the plurality of switches OSW1 to OSW8, the signal φCNTO1 which controls the counter circuit, and the signal φADCLAT1 which controls the ADC latch circuit 5 change to "HIGH". As a result, the output signals of the plurality of delay units DU1 to DU8 and the count value φOCNT1 of the counter circuit 45 are output to the ADC latch circuit 5.

Then, the signal φADCLAT1 changes to "LOW" and accordingly, the ADC latch circuit 5 holds an output signal of the A/D converter 4. Then, at a timing T36, the clock signal φOCK1, the signal φCNTO1, and the start pulse φST1 change to "LOW". As a result, the A/D converter 4 stops the output of a signal and the A/D conversion period ends.

As described above, according to the present embodiment, the output signals of the delay units DU1 to DU8 can be held without providing a latch circuit similar to the first embodiment. In addition, when reading the output signals of the delay units DU1 to DU8, the power supply voltage of each of the delay units DU1 to DU8 does not depend on the input voltage. For this reason, compared with the first embodiment, output signals of the delay units DU1 to DU8 can be stably read in the present embodiment. Therefore, reductions in size and power consumption of a solid-state imaging device can be realized and a signal from a sensor can be stably read at high speed.

Figure 8:
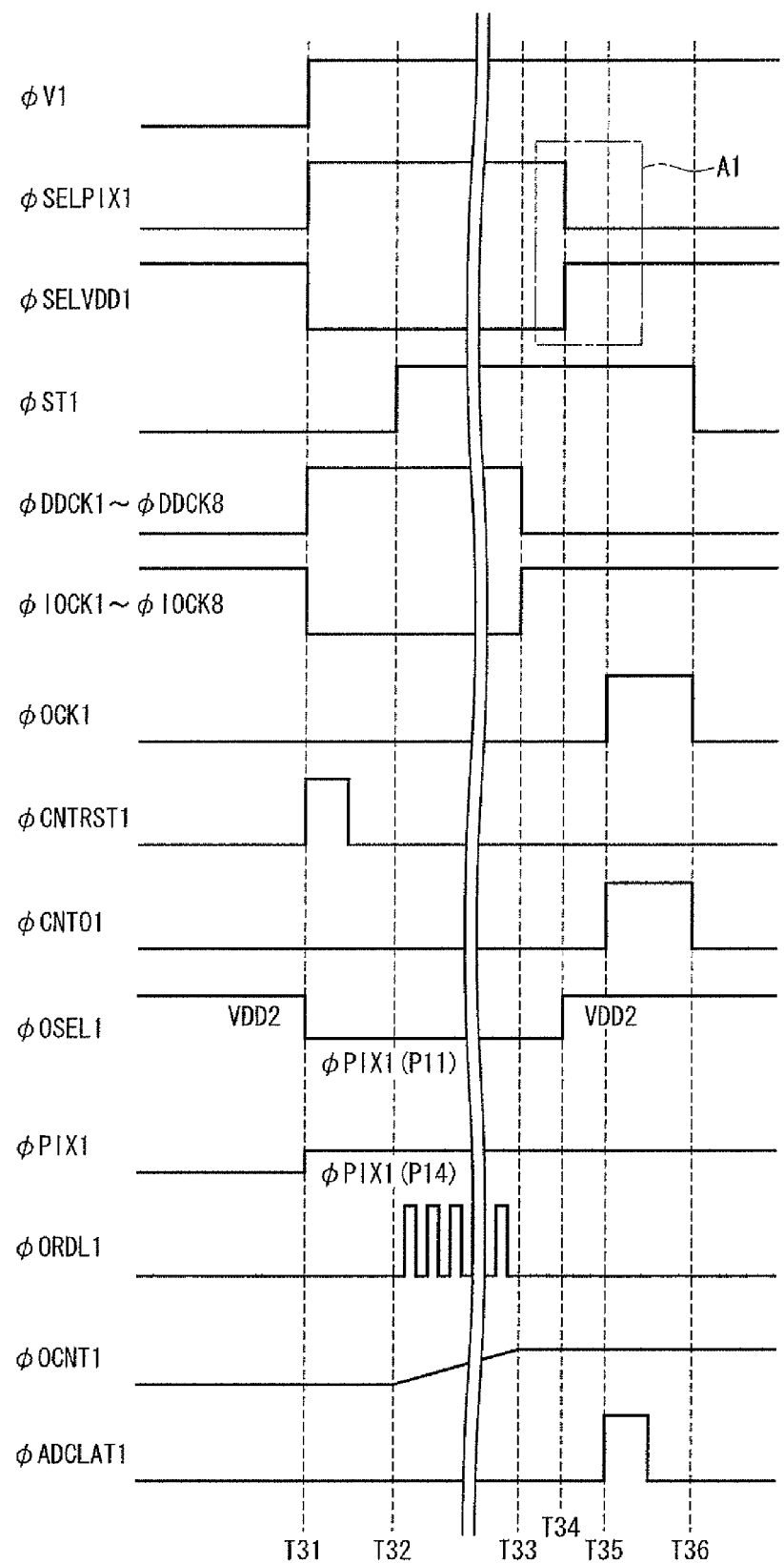
FIG. 8 is a timing chart showing the operation of the solid-state imaging device according to the third embodiment of the invention.

Moreover, the output signals of the delay units DU1 to DU8 can be more stably read by changing a driving timing of a signal (φSELPIX1 and φSELVDD1) which controls the switching circuit 52. Two modifications are illustrated below. In addition, only a part corresponding to the area A1 in the timing chart shown in FIG. 8 will be described, and an explanation regarding the other driving timings will be omitted because they are the same as described above.

First Modification

A first modification will be described using a timing chart shown in FIG. 9. First, at a timing T34, the pixel signal selection signal φSELPIX1 changes to "LOW". At this time, the constant-voltage selection signal φSELVDD1 remains at "LOW". Then, at a timing T34', the constant-voltage selection signal φSELVDD1 changes to "HIGH". As a result, a situation does not occur where the switches SW521 and SW522 are turned on simultaneously. For this reason, since a current path is not made between the pixel signal φPIX1 and the constant voltage VDD2, the output signals of the delay units DU1 to DU8 can be stably read.

Second Modification

Figure 10:
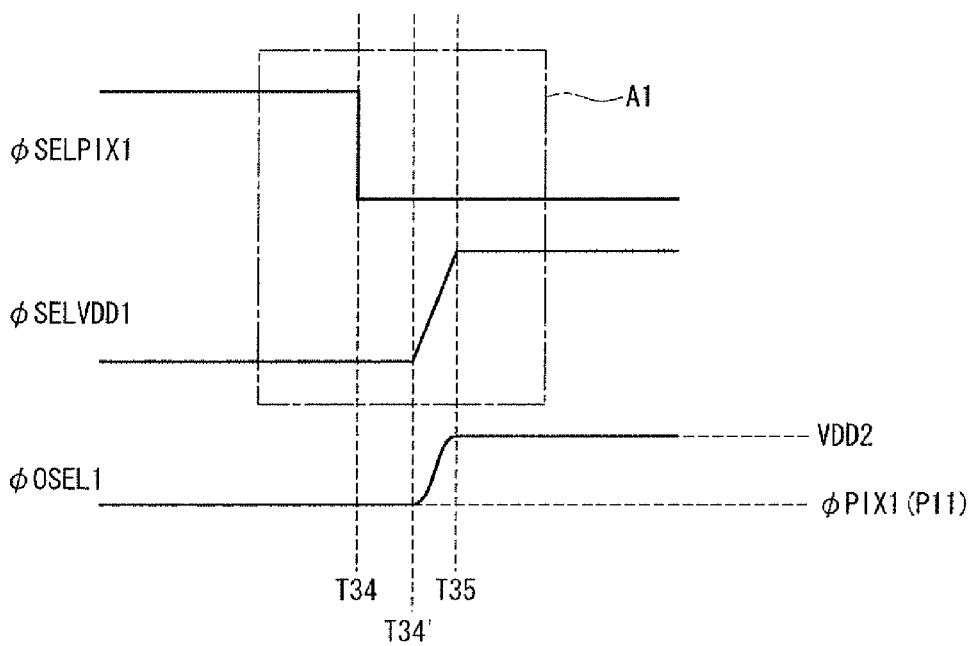
FIG. 10 is a timing chart explaining another operation of the solid-state imaging device according to the third embodiment of the invention.
Figure 11:
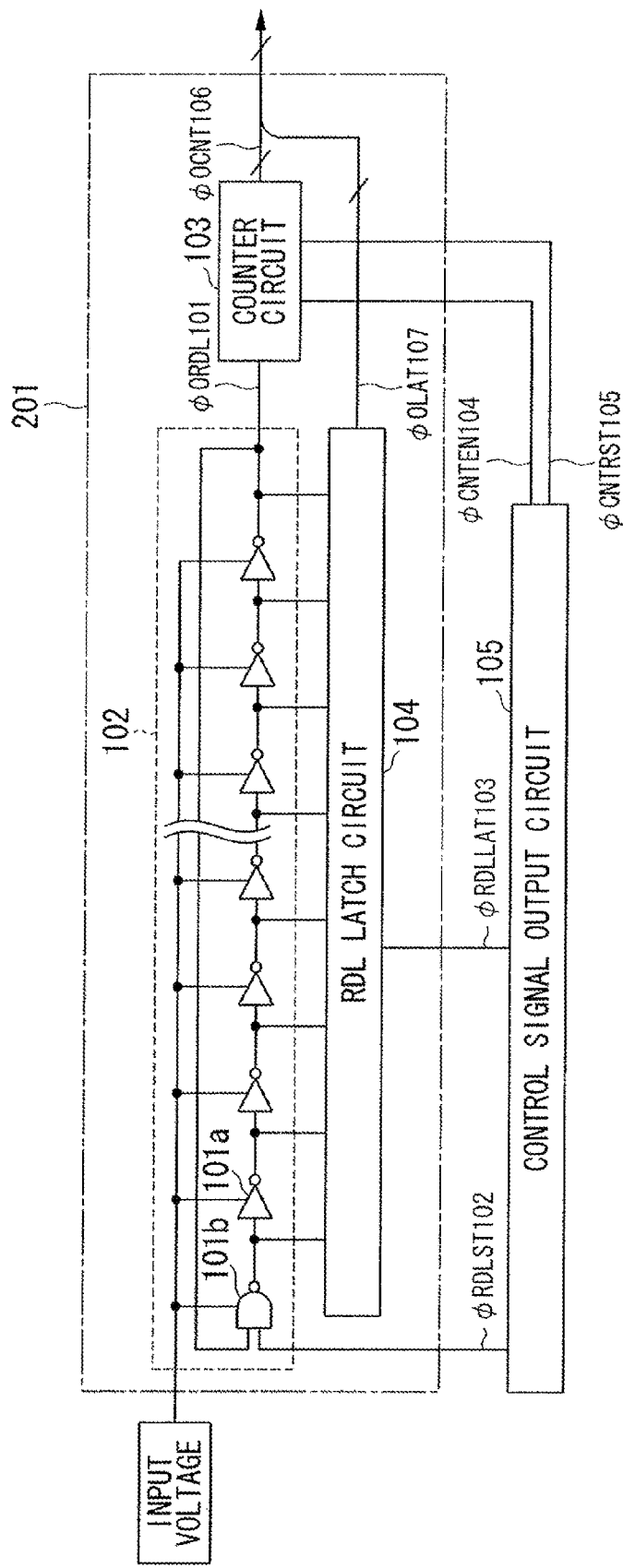
FIG. 11 is a block diagram showing the configuration of an A/D converter in the related art.
Figure 12:
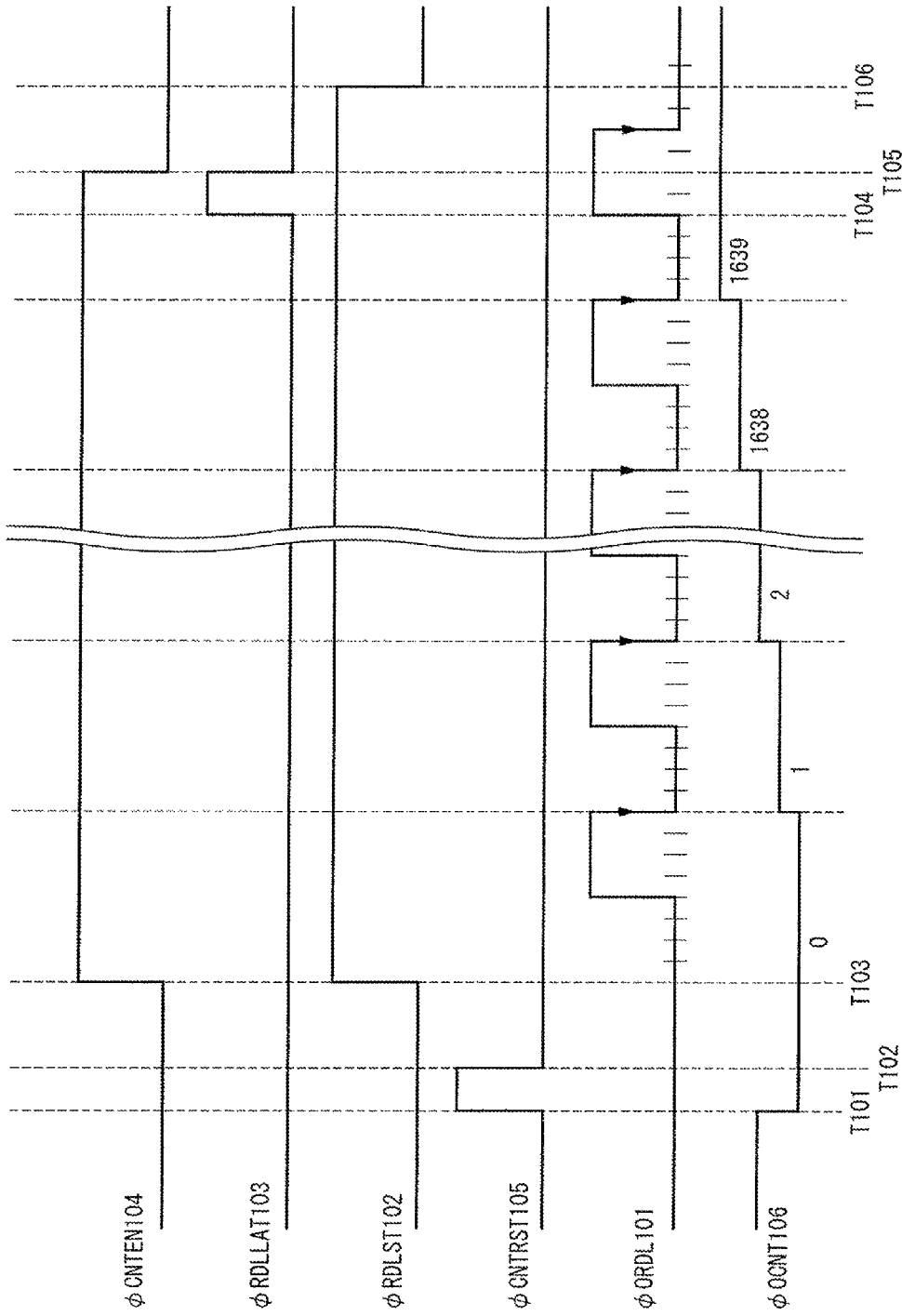
FIG. 12 is a timing chart showing the operation of an A/D converter in the related art.
Figure 13:
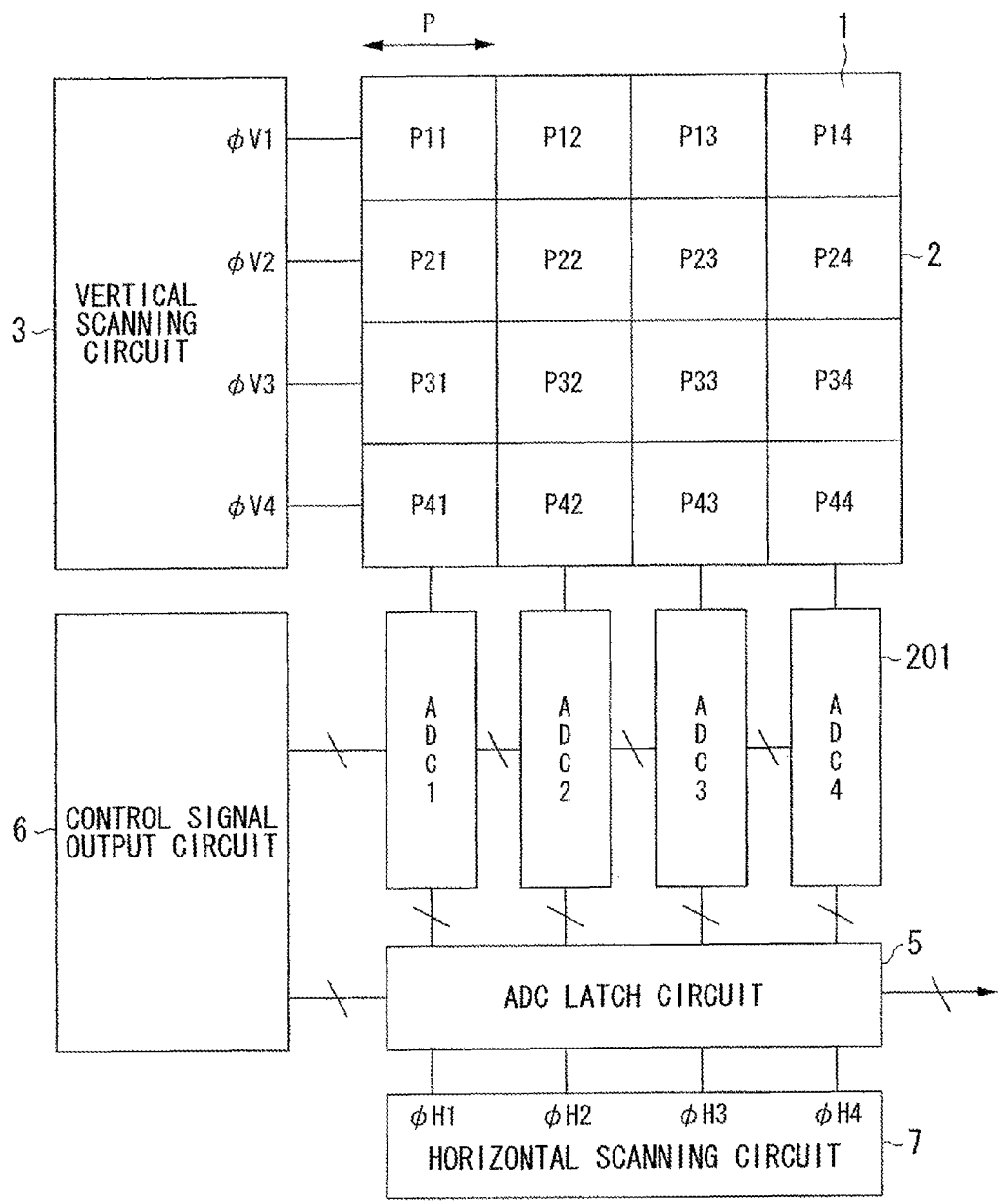
FIG. 13 is a block diagram showing the configuration of a solid-state imaging device in the related art.

A second modification will be described using a timing chart shown in FIG. 10. First, at a timing T34, the pixel signal selection signal φSELPIX1 changes to "LOW". Then, from a timing T34' to a timing T35, the pixel signal selection signal φSELVDD1 changes to "HIGH" gradually As a result, the power supply voltage of each of the delay units DU1 to DU8 gradually changes from the signal level of the pixel signal φPIX1 to the signal level of the power supply voltage VDD2. Therefore, the mixing of noise into the output signal of each of the delay units DU1 to DU8 can be prevented. Therefore, the output signals of the delay units DU1 to DU8 can be read more stably.

While the embodiments of the invention have been described in detail with reference to the accompanying drawings, the specific configuration is not limited to the above-described embodiments and design changes and the like within the scope without departing from the subject matter of the invention are also included.

What is claimed is:

1. A solid-state imaging device comprising:
   a plurality of pixels arrayed in a matrix; and
   a plurality of AD conversion circuits provided for every column of the plurality of pixels and which converts analog signals from the plurality of pixels into digital signals,
   wherein each of the plurality of AD conversion circuits includes:
   a ring delay circuit which has a plurality of delay units that outputs a pulse signal input to a pulse input terminal from a pulse output terminal after delaying the pulse signal by a delay time corresponding to the analog signal, in which the pulse output terminal of each of the plurality of delay units is connected to the pulse input terminal of the next-stage delay unit, and in which the plurality of delay units is connected to each other in a ring shape so that the pulse signal circulates through the plurality of delay units;
   a plurality of first switches each of which is connected between the pulse output terminal of each delay unit and the pulse input terminal of the next-stage delay unit;
   a plurality of second switches each of which is connected between the pulse output terminal and the pulse input terminal of each of the delay units; and
   a control circuit which turns on the plurality of first switches and turns off the plurality of second switches in conjunction with an oscillation operation and which turns off the plurality of first switches and turns on the plurality of second switches in relation with a holding operation.

2. The solid-state imaging device according to claim 1, wherein each of the plurality of AD conversion circuits further includes a third switch connected to the pulse output terminal of one of the plurality of delay units, and the control circuit turns on the third switch in relation with a read operation in a hold state so that the first switch is turned on and the second switch is turned off in a sequential manner.

3. The solid-state imaging device according to claim 1, wherein each of the plurality of AD conversion circuits further includes a third switch connected to the pulse output terminal of each of the delay units, and the control circuit turns on the third switch in conjunction with a read operation in a hold state.

4. The solid-state imaging device according to claim 1, wherein each of the plurality of AD conversion circuits further includes a switching circuit which has a first input terminal to which the analog signal is input, a second input terminal connected to a constant voltage source, and an output terminal connected to power input terminals of the plurality of delay units and which selects a first state, in which the analog signal input to the first input terminal is output from the output terminal, or a second state, in which a signal from the constant voltage source input to the second input terminal is output from the output terminal.

5. The solid state-state imaging device according to claim 4, wherein the switching circuit selects the first state during a period of the oscillation operation and selects the second state during a period of the holding operation.

6. The solid-state imaging device according to claim 4, wherein the switching circuit has a period, for which neither the first state nor the second state is selected, when the first state switches to the second state.

7. The solid-state imaging device according to claim 4, wherein a voltage output from the output terminal of the switching circuit gradually changes when the first state switches to the second state.

* * * * *